United States Patent Office 2,981,697
Patented Apr. 25, 1961

2,981,697

ACID-TREATED CLAY PROCESS

Grant A. Mickelson, Woodstock, and Wilbur Simon and Gordon H. Tibbitts, Crystal Lake, Ill., assignors to Morton Chemical Company, Chicago, Ill., a corporation of Delaware No Drawing. Filed Feb. 21, 1958, Ser. No. 716,557

13 Claims. (Cl. 252—450)

This invention relates to the production of acid-activated decolorizing clays and more particularly relates to a process for the acid activation of sub-bentonite type clays.

It is well established in the art that there are many naturally occurring clays and earths which possess potential utility as decolorizing agents or catalytic materials for a variety of purposes. These products have broad utility in a number of industries, one of particular importance being the refining of petroleum and other oil products. Quite often these clays do not in their natural state possess the properties desired, at least not to the extent which would render their use practical or economical. Accordingly it has been necessary to treat clay materials by a variety of processes in order to bring out to the best advantage their potentials for the use intended. While the treatment varies according to the end use of the product, it is conventional to treat the clty by acid activation, heat, or both. Quite often the methods of treatment utilized in a given instance govern in large part the final properties and efficiency of the product. The prior art has suggested the treatment of clays, and particularly bentonite clays, with inorganic acids to activate the same for use as decolorants or catalysts. High temperatures have also been used to bring out certain properties of the clay material. However, the prior art processes fail in certain respects to produce a product which has as full utility, or utility to the extent desirable, as may be achieved by the improved techniques of the hereinafter described invention.

Accordingly it is one object of the present invention to provide an improved process for the acid activation of sub-bentonite clays.

Another object is the provision of a process for acid activation of bentonite clays which is both economical and efficient.

A further object is the provision of an improved activated clay which has improved decolorizing properties.

A still further object is the production of an activated sub-bentonite decolorizing clay which is characterized by a lower content of soluble iron salts.

These and other objects of the present invention will be more clearly understood by reference to the following specification and appended claims.

In one broad form the process of the present invention includes a method for the production of activated clay which comprises treating a bentonite type clay with a relatively high concentration of hydrochloric acid at elevated temperatures, washing the hydrochloric acid-treated clay until substantially free of soluble chlorides, treating of the clay with a relatively nonvolatile strong inorganic acid, and drying the resultant product under flash-drying conditions.

Generally the clays which may be advantageously treated by the present process are bentonites and more specifically the calcium and magnesium sub-bentonites. These clays are often identified by reference to their occurrence geographically. Accordingly, clays which are exemplary of the aforementioned broad classification are found in the geological outcropping of bentonite clays occurring in eastern Texas. The geological and geographical description of this area is found in a publication by Hagner, A. F., "Absorptive Clays of the Texas Gulf Coast," American Mineralogist, vol. 24, pp. 67–108 (1939). Of particular suitability with regard to the present invention are clays located on the Christian Lease—located in Gonzales County, Texas, and the Kenard Lease in Gonzales County, Texas.

Prior to processing, the clay as received is in the form of large chunks which are crushed to pass a 3 or 4 mesh screen. This untreated raw clay has a volatile matter content (water, carbonates, organics, etc.) of about 40%. Inasmuch as moisture and other volatile matter content of the crude bentonite can vary quite widely, it is necessary to calculate the proper ratio of reactants required to treat the clay on a "volatile free" (which for purposes of brevity can be abbreviated as V.F.) basis.

The hydrochloric acid treatment of the raw clay is preferably carried out by the use of commercial muriatic acid. The ratio of hydrochloric acid to clay may vary. Calculated on a volatile free basis with respect to the clay utilized or treated, the amount of 100% hydrochloric acid (i.e. hydrogen chloride) used may vary from about 15 to 50 weight percent of the V.F. clay and preferably from 20 to 35 weight percent of the V.F. clay. Alternatively the amount of hydrochloric acid required may be set forth in terms of dosage which is the aforesaid value of weight percent of 100% hydrogen chloride (HCl) as contained in hydrochloric acid based on treatment of volatile free clay. Thus in these terms the clay may be treated with from 15 to 50 dosage of hydrochloric acid in the broadest embodiment and from 20 to 35 dosage of hydrochloric acid in the most preferred embodiment. Of course, hydrochloric acid is used in aqueous solution and the percentage of hydrochloric acid therein in relation to the aqueous component should be taken into account when carrying out this phase of the treatment. The hydrochloric acid treatment step is carried out in aqueous media under slurry conditions, and the concentration of acid in the slurry should be from 5 to 25 percent and preferably from 5 to 20 percent, based on the total aqueous component. Thus, the amount of water in the raw clay and the amount of water in the acid should be considered a part of the aqueous component and taken into account as well as water additionally provided when determining the concentration of the acid component.

As indicated, the hydrochloric acid treatment or reaction is carried out at elevated temperatures, preferably above 80° C. The treatment may be carried out at temperatures as high as 105° or 110° C. or higher if superatmospheric pressure is used. While the upper limit is not a critical factor in the present process, it should be stated that 80° C. is the preferred minimum. The time of reaction may vary, being dependent in part upon the amount of hydrochloric acid utilized as well as the concentration and the temperature range. Thus at the higher concentrations of hydrochloric acid present in maximum ratio to the clay and carried out at higher temperatures, the time required is less than if one utilized the lower values of these reactants and conditions. Generally from one to twenty-four hours is a satisfactory reaction time, and a time of from two to eight hours is preferred. While a longer time of treatment may be employed without detriment, it is uneconomical.

As indicated above, it is preferred that the process of the present invention be carried out under slurry conditions, inasmuch as excessive dilution will result in reducing the acid concentrations to below the preferred values. Generally a solids content of from 10% or 15% up to 40% is satisfactory. It is also a preferred procedure of this invention to carry out the reaction with accompanying agitation or stirring of the reaction mixture.

The washing of the hydrochloric acid treated clay may be carried out by a variety of methods such as filtration and successive rinsing of the filter cake with water. One preferred procedure is the use of decantation, wherein the treated clay is treated with successive portions of rinse water which, after stirring and settling of the clay, are removed therefrom by conventional decantation methods.

In general, it should be stated that the washing step is carried out until the clay is substantially free of chloride as evidenced by the substantial absence of chloride ion in the wash water. The washing should be continued until the wash water contains a maximum of 0.15 percent chloride ion. When the treated clay has been washed substantially free of chloride ion, as indicated above, it is then subjected to a second acid treatment utilizing a strong relatively nonvolatile inorganic acid such as, for example, inorganic acids preferably selected from the group consisting of sulfuric and phosphoric acids, of which sulfuric acid is the most preferred. The dosage or weight ratio of sulfuric acid or phosphoric acid to the clay may vary, but generally it may be stated that broadly a dosage of from 1 to 20 parts by weight of the pure acid, based on 100 parts by weight of volatile-free clay resulting from the hydrochloric acid treatment and washing, is satisfactory. Dosage as herein utilized is in the same terms as previously described for the hydrochloric acid treatment. The time of treatment may vary extending up to about thirty minutes with from about ten to twenty minutes being a preferred treatment time. This second acid treatment with sulfuric or phosphoric acid is preferably carried out at ambient temperatures, which may alternatively be expressed as substantially nonreacting conditions. Generally temperatures of from 10° to about 50° C. are satisfactory for this step.

The added sulfuric acid does not react appreciably with the cations in the clay lattice structure at conditions described but rather replaces iron, aluminum, chloride and other ions adsorbed on the clay and silica surfaces. If a sample is taken from the filtrate obtained by filtering a portion of the settled solids from the third decantation and tested for ferric ion with sodium or ammonium thiocyanate, a faint pink coloration due to the ferric thiocyanate complex is observed. However, if one similarly tests a sample of the filtrate from the same sludge following the sulfuric acid addition, a deep red coloration due to the ferric thiocyanate complex is observed. Five to ten times as much iron is present in the latter. This shows that the treatment with dilute sulfuric acid tends to wash out and remove the adsorbed iron chloride from clay activated with hydrochloric acid.

The treatment with sulfuric acid or equivalent is generally carried out in an aqueous medium, the concentrations of acid with respect to the aqueous components of the medium varying broadly from about ½ to 5 percent, and preferably from 1 to 2 percent.

The filter cake or settled activated clay slurry resulting from the washing step is treated with the sulfuric acid preferably without prior removal of the moisture contained therein. Of course, inasmuch as the clay resulting from this step contains a considerable amount of moisture, it is usually in the form of a sludge. The sulfuric acid treatment may be carried out by (1) slurrying the aforesaid filter cake or sludge with the sulfuric acid reagent followed by decantation or (2) by washing the filter cake with very dilute aqueous sulfuric acid.

Although it is preferable to treat the activated clay slurry or to wash the filter cake with dilute sulfuric acid without intermediate drying, the dried product from hydrochloric acid treatment may also be improved by reslurrying it in 3% to 4% sulfuric acid. After mixing the suspension for about one-half hour the slurry may be filtered and the cake redried. This product has a substantially higher decolorizing power than the dried product from which it was made. The dilute sulfuric acid filtrate contains iron, aluminum and calcium salts and also substantial amounts of chloride ions, showing that adsorbed constituents which cannot be washed out with water are removed by dilute sulfuric acid treatment.

After the sulfuric acid treatment, the excess sulfuric acid is removed, as aforesaid, and the product dried to remove water and other undesirable volatiles. Generally the clay is dried to a volatile matter (primarily water) content of from 10 to 30 percent, with from about 18 to about 25 percent being preferred. The drying step is preferably carried out under rather closely controlled conditions and it should be stated that in general the drying should be carried out under conditions wherein the temperature of the clay does not exceed at any given time 100° C. and preferably 80° to 90° C. Generally this drying may be carried out by brief exposure of the clay to superheated atmospheres (400° C.) accompanied with agitation or stirring. Flash drying techniques are valuable in this respect, and exemplary of preferred procedures.

Inasmuch as the drying step results in the removal of water vapor and other volatile material, the evaporation during the drying step results in maintaining the temperature of the clay below the maximum temperature of 100° C., so long as sufficient moisture remains in the clay. When the clay has been reduced to the desired volatile content, the product is pulverized preparatory for use as a decolorant catalyst, or the like. It is preferred that the clay be crushed or comminuted sufficiently to pass through a 180 to 200 mesh screen.

The process of the present invention may be more clearly understood by reference to the following examples:

EXAMPLE I

Into a five-liter round bottom three-necked flask equipped with a reflux condenser, stirrer and thermometer, were placed 1508 grams (1000 grams on a volatile free basis) of crushed white bentonite clay from the middle soft layer of the Christian Pit in Gonzales County, Texas, 780 grams of 32% aqueous hydrochloric acid (25 dosage) and 1960 milliliters of water. The resulting slurry (about 25% solids) was heated to boiling and maintained at reflux (105° C.) with stirring for about six hours. The contents of the flask were then transferred to a 20 liter (5 gallon) vessel to which were added about 12 liters of water with stirring. The slurry was then permitted to settle for a period of about 12 to 14 hours. After settling, the supernatant clear liquid was decanted from the solids. The residual clay solids were diluted with about 4 liters of tap water with stirring followed by settling and decantation. A third decantation utilizing the same amount of water (about 4 liters) and procedure was carried out. The settled activated clay slurry containing about 800 grams of activated clay on a volatile free (V.F.) basis having a volume of about 1500 milliliters was treated with about 15 milliliters (27.6 grams, a dosage of about 3) of concentrated (96%) sulfuric acid. The resulting slurry was stirred at room temperature for about fifteen minutes and then filtered. The residue of treated clay was then dried rapidly with agitation in an oven maintained at about 400° to 600° C. During this rapid drying (similar to flash drying techniques) the temperature of the clay is maintained at from 70° to 80° C. The clay was dried to a residual volatile content of about 22.2%. The dried product was then comminuted by passage through a hammer mill and then a ball mill, reducing the product to a degree of fineness so as to pass 90% through a 200 mesh screen.

EXAMPLE II

Similar experiments were carried out in the same manner as that of Example I (25 dosage of HCl), utilizing however various amounts of sulfuric acid or phosphoric acid in the final or second acid treatment of aliquot portions of the hydrochloric acid treated clay. The amount of clay treated in the second acid wash was about 400 grams (V.F.) in each instance. The clay utilized in this experiment was a white bentonite comprising three parts middle soft layer to one part bottom soft layer from the Christian Pit in Gonzales County, Texas. The results of this treatment along with the data on the relative efficiency of the activated clay as a decolorizing agent are given in Tables I and II below:

Table I
PROPERTIES OF DRIED PRODUCT

| Run No. | Acid Added | | V.M.[1] | Acidity[2] KOH per Gram | pH[3] |
|---|---|---|---|---|---|
| | Kind | Amount, ml. | | | |
| A | None | None | | | |
| B | Conc. H₂SO₄* | 5 | 23.09 | 2.05 | 2.10 |
| C | Conc. H₂SO₄* | 10 | 24.90 | 5.05 | 1.05 |
| D | Conc. H₂SO₄* | 15 | 25.50 | 7.55 | 1.65 |
| E | Conc. H₂SO₄* | 20 | 27.70 | 10.90 | 1.50 |
| F | Conc. H₃PO₄** | 5 | 27.72 | 2.85 | 2.50 |
| G | Conc. H₃PO₄** | 10 | 24.90 | 4.65 | 2.30 |
| H | Conc. H₃PO₄** | 15 | 23.34 | 6.35 | 2.20 |
| I | Conc. H₃PO₄** | 20 | 22.20 | 9.00 | 2.10 |

[1] V.M.: Volatile matter.
[2] Acidity is expressed as the milligram of KOH required to neutralize the acid removed from 1 gram of product by washing it with hot distilled water.
[3] pH of a slurry containing 10 grams of product in 50 milliliters of distilled water.
*96–97% sulfuric acid.
**96–97% phosphoric acid.

The acidity as defined in footnote 4 of Table I is determined in the following manner:

About 2 grams of product is boiled in 200 milliliters of distilled water for two minutes, filtered, washed with boiled distilled water and titrated to the phenolphthalein end point with a standard potassium hydroxide solution. From this data the milligrams of KOH required per gram of clay is calculated.

Decolorizing experiments were carried out utilizing the clay products A through I prepared as shown in Table I in the following manner:

Three hundred (300) grams of caustic refined but unbleached soya oil was treated with 9 grams of activated clay and heated to 120° C. over a five minute interval. The temperature was maintained at 120°±2° C. and the oil-clay slurry agitated as described in the A.O.C.S. official method Cc–8b–52 for a period of fifteen minutes. The slurry is then filtered and oil cooled to room temperature, and its optical density measured in a spectrophotometer, such as, for example, a Coleman Model B, at 4700 angstroms. The efficiency rating is obtained by comparing the optical density of the various samples with that of the oil decolorized by an equivalent amount of A.O.C.S. official standard acid-activated bleaching earth as 100% efficient.

The results of these experiments utilizing clay A through F are set forth in Table II.

Table II

| Run No.: | Relative Efficiency Soya Oil |
|---|---|
| A | 147 |
| B | 218 |
| C | 215 |
| D | 256 |
| E | 240 |
| F | 209 |
| G | 241 |
| H | 265 |
| I | 268 |

The following example will illustrate sulfuric acid treatment of muriatic acid treated clay which has been subjected to intermediate drying.

EXAMPLE III

Two hundred and fifty (250) grams of HCl activated clay dried to 21% V.M. and having an efficiency of 77% on refined soya oil, was slurried in 1.5 liters of water. Twenty-five milliliters of 96.8% sulfuric acid was added, and the suspension was stirred for about one-half hour. The clay was filtered and rapid pan dried to 11% V.M. The efficiency of the new product was 110% of standard on refined soya oil.

While the foregoing examples illustrate the usefulness of the sub-bentonite clays prepared in accordance with the process of the present invention for the decolorization of soyal oil, it is also true that they have similar utility with respect to the decolorization of other substances such as, for example, lube oil and the like. While these products are valuable as decolorizing clays, it is also possible by variation of the treatment such as carrying out the drying step at extremely high temperature, maintaining larger particle size in the product and reducing the volatile matter content to low values that clays which have catalytic activity may also be produced.

While the mechanism of the process of the present invention is not fully understood, it is believed that the particular sequence of steps utilizing the above reagents indicates the removal of interfering iron compounds such as ferric chloride, which contribute to the color of oils such as soybean oil. These steps, taken to insure the complete removal of iron, apparently result in a product which is considerably more efficient than those produced by the methods of the prior art.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process for preparing an acid-activated decolorizing clay which comprises treating an acid-activatable subbentonite clay with from 15 to 50 dosage of hydrogen chloride in aqueous solution at a temperature above 80° C., wherein said hydrogen chloride is present in said solution in a concentration of from 5 to 25 percent with respect to aqueous components, washing said treated clay with water until substantially free of chlorides, and treating the washed clay with from 1 to 20 dosage of an acid selected from the group consisting of sulfuric acid and phosphoric acid at a temperature below about 50° C. to remove the residual chlorides, removing excess acid from the clay, and flash-drying the product wherein the clay temperature does not exceed 100° C.

2. A process for preparing an acid-activated decolorizing clay which comprises treating an acid-activatable sub-bentonite clay in an aqueous solution containing from 20 to 35 dosage of hydrogen chloride at a temperature above about 80° C., said acid being present in a concentration of from 5 to 25 percent with respect to aqueous components, washing said treated clay with water until substantially free of chlorides, treating the washed clay with an aqueous solution of from 1 to 20 dosage of sulfuric acid at a temperature below about 50° C. to remove the residual chlorides, removing excess acid from the clay, and flash-drying said product by techniques wherein the temperature of the clay does not exceed 100 degrees C.

3. A process for preparing a decolorizing clay substantially free of iron salts which comprises treating an acid-activatable sub-bentonite clay in an aqueous medium with from 20 to 35 dosage of hydrogen chloride, maintaining said reactants at a temperature of at least 80°

C. during said treatment, washing said clay to remove the hydrochloric acid until the clay is substantially free of chlorides, treating the washed clay with from 1 to 20 dosage of an acid selected from the group consisting of sulfuric acid and phosphoric acid at a temperature below about 50° C. and for a period of up to 30 minutes, removing the excess acid from said clay, drying the clay to a volatile matter content of from 10 to 30 percent under flash-drying conditions wherein the clay temperature does not exceed 100° C.

4. The process of claim 3 wherein the concentration of the hydrogen chloride is from 5 to 25 weight percent with respect to aqueous components.

5. The process of claim 3 wherein the hydrogen chloride treatment is carried out at a temperature of from 80° to 110° C.

6. The process of claim 3 wherein the treatment with hydrogen chloride is carried out for a period of from 1 to 24 hours.

7. The process of claim 3 wherein the washed clay is treated with sulfuric acid for a period of from 5 to 30 minutes.

8. A process for preparing an acid-activated decolorizing clay substantially free of soluble iron salts which comprises forming a slurry of an acid-activatable sub-bentonite clay in an aqueous hydrogen chloride solution wherein the hydrogen chloride is present in a dosage of from 20 to 35 with respect to the volatile-free clay and the concentration of hydrogen chloride in the aqueous medium is from 5 to 25 percent by weight, heating the slurried clay and hydrochloric acid at a temperature between about 80° C. and 110° C. for a period sufficient to convert iron compounds therein to iron chlorides, separating the acid-treated clay from the aqueous acid component of the slurry and washing the residual clay with water until the wash water is substantially free of chlorides, treating the washed clay with from 1 to 20 dosage of sulfuric acid at a temperature below about 50° C. and for a period not exceeding 30 minutes, removing the preponderance of sulfuric acid from said clay and drying said clay to a volatile matter content of from 10 to 30% under flash drying conditions wherein the temperature of the treated clay does not exceed 100° C.

9. The process of claim 8 wherein the hydrogen chloride is present in a dosage of from 15 to 50.

10. The process of claim 8 wherein the concentration of sulfuric acid is from ½ to 5 percent with respect to aqueous components.

11. The process of claim 8 wherein the treatment with sulfuric acid is carried out by washing the filter cake of water-washed clay with sulfuric acid.

12. The process of claim 8 wherein the wash water contains less than 0.15% chloride ion.

13. The process of claim 8 wherein the sulfuric acid treatment is carried out at a temperature of from 10° to 50° C.

References Cited in the file of this patent

UNITED STATES PATENTS

| | | |
|---|---|---|
| 2,484,828 | Hickey | Oct. 18, 1949 |
| 2,892,800 | Taipale | June 30, 1959 |